Sept. 16, 1952     J. C. HANNA     2,610,846
PACKING RING
Filed Dec. 2, 1949           2 SHEETS—SHEET 1
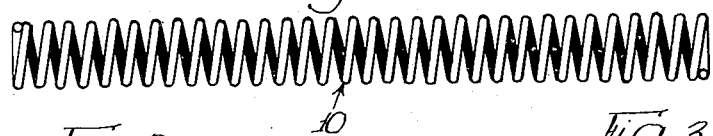
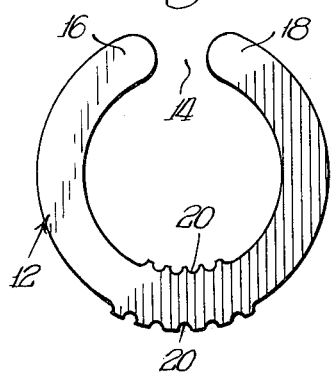
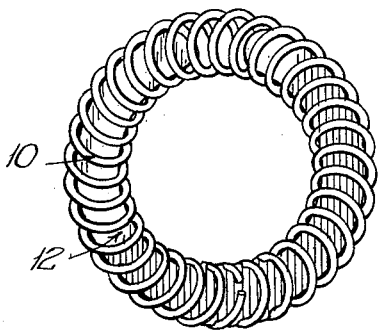
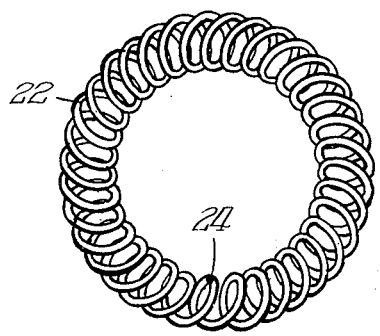
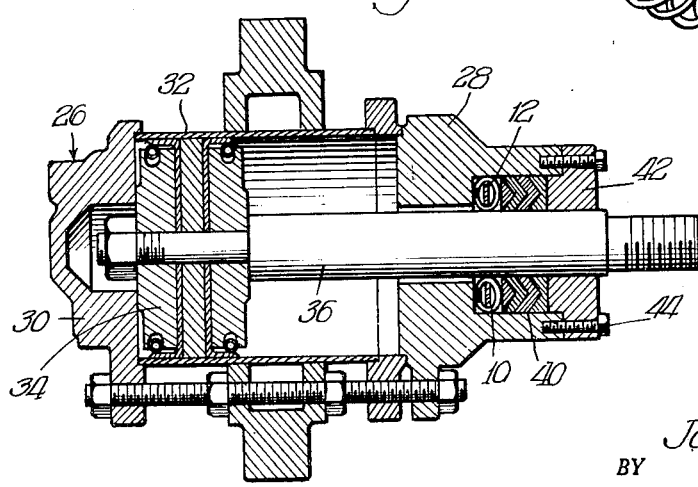
INVENTOR.
John C. Hanna,
BY
Wilkinson Huxley Byron & Hume
Attys.

INVENTOR.
John C. Hanna,
BY

Patented Sept. 16, 1952

2,610,846

UNITED STATES PATENT OFFICE 2,610,846

PACKING RING

John C. Hanna, Chicago, Ill., assignor to Hanna Engineering Works, Chicago, Ill., a corporation of Illinois Application December 2, 1949, Serial No. 130,768

4 Claims. (Cl. 267—1)

1

The invention relates to springs and has reference more particularly to an improved resilient spring member especially designed for use with packing for sealing rotating and reciprocating shafts against the leakage of fluid.

Conventional packing for sealing rotating shafts, piston rods and the like may consist of strands of packing material held under pressure in a cavity or recess surrounding the shaft. Another form of packing material for similar purposes consists of packing rings which are V-shaped or chevron-shaped in cross section and since the pressure is applied in the direction of the pointed end the respective edges perform the desired sealing function. However, space limitations within the packing cavity or recess is such that a conventional coil spring of only one or two convolutions can be employed and accordingly the applied pressure on the packing is generally insufficient for most effective sealing.

An object of the invention is to provide a novel packing spring for applying pressure to conventional packing material and which will apply a much greater pressure for its size than the springs heretofore used.

Another object is to provide a novel and unique spring which may have utility in many different arts by reason of a distinguishing characteristic pertaining to its deflection under load and which is in direct proportion to the load up to about a fifty per cent load limit and is non-proportional beyond said limit.

Another object of the invention resides in the provision of a pressure spring which will be capable of applying a relatively heavy pressure for its size and which pressure will be applied in a uniform manner and evenly distributed over the entire circular area encompassed by the spring.

Another object is to provide a pressure spring which will essentially consist of a coil spring of adequate length, the ends of which have been joined to form an annular resilient member and wherein the convolutions have been partially flattened either before or after such formation.

Another object is to provide a pressure spring for the purposes described which will be simple in design, durable in construction and thus capable of efficient service over long periods of use.

With these and various other objects in view, the invention may consist of certain novel features of construction and operation as will be more fully described and particularly pointed out in the specification, drawings and claims appended hereto.

2

In the drawings which illustrate an embodiment of the invention, and wherein like reference characters are used to designate like parts—

Figure 1 is an elevational view showing a conventional coil spring of a length suitable for forming the present packing spring;

Figure 2 is a plan view of a retainer on which the packing spring is mounted;

Figure 3 is a plan view of the complete packing spring of the invention;

Figure 4 is an elevational view of the packing spring shown in Figure 3;

Figure 5 is a plan view of a modified form of packing spring wherein the retainer is eliminated;

Figure 6 is a longitudinal sectional view of a pressure cylinder illustrating a preferred use of the present packing spring.

Figure 7:
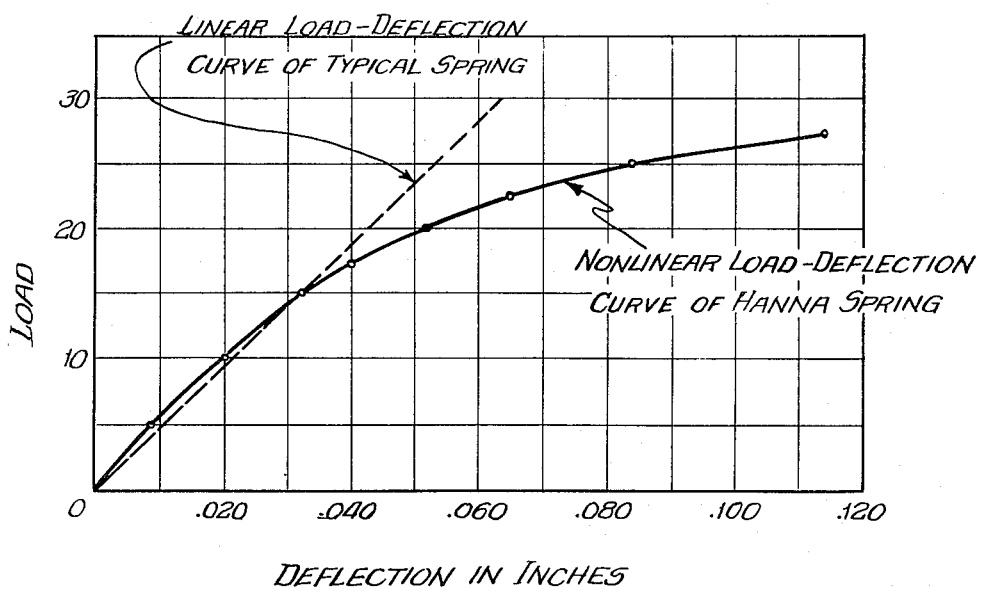
Figure 7 is a graph illustrating the linear and non-linear load deflection characteristics of the spring.

Referring to the drawings which illustrate the preferred embodiment of the invention, numeral 10 indicates a conventional coil spring formed of spring wire and which has a length suitable for use as the resilient element of the packing spring of the invention. In addition to the resilient element 10 the packing spring consists of a retaining member 12 which is in the form of a ring having an opening 14 and providing spaced ends 16 and 18. The coil spring 10 is mounted on the retaining member and it is preferred that the convolutions of the spring 10 be flattened in advance of this mounting operation. Accordingly, by the application of pressure in a diagonal direction to the convolutions of the coil spring 10 the said convolutions are partially flattened or said convolutions may be described as being disposed parallel to each other in a diagonal direction to yieldingly oppose compressive forces exerted perpendicularly to the center line of the convolutions, whereas with the conventional spring, as shown in Figure 1, the convolutions are substantially vertical.

The flattened coil spring is then mounted on the retaining member 12 by telescoping the spring over the arcuate ends of said member. It will be observed that notches 20 are formed in the edges of the retaining member at a location diametrically opposite the opening 14. The notches 20 are formed on the outside edge and also on the inside edge so as to receive the wire element of adjacent convolutions and which are respectively engaged at points spaced diametrically opposite each other. Five or six of said notches is all that is required to retain the two end sections of the coil spring 10 on the retaining member. A complete packing ring is shown in Figures 3 and 4 and it will be clear from said figures that the function of the retaining member is to maintain the flattened coil spring in an arcuate shape and to impart rigidity to the completed structure. When the conventional coil spring 10 is flattened, as has been described, the member has a tendency to curl and which is such as to bring the two ends of the spring into adjacent relation. This facilitates the threading or telescoping of the spring member on the retaining member and assists the retaining member in holding the completed packing spring to an annular shape. Said retaining member is formed of relatively strong metal and is substantially flat throughout its extent. It is not necessary to join the two ends of the coil spring after the same has been mounted on the retainer since the notches 20 securely hold the parts together maintaining the adjacent convolutions at each end of the spring in proper spaced relation.

It is possible to modify the structure of the packing spring of the invention by eliminating the retaining member 12. Such a packing spring is shown in Figure 5 wherein the flattened coil spring is indicated by numeral 22. To construct the packing spring as shown in Figure 5 a conventional coil spring such as 10 is employed. The convolutions of the spring are flattened by pressure applied thereto to dispose the convolutions angularly and following this operation there is a tendency for the flattened spring to assume an arcuate shape. To form the ring of Figure 5 the two ends of the flattened coil spring are joined as at 24. The packing spring of Figure 5 is therefore similar in all respects to that of Figure 3 with the exception that the retaining member has been eliminated and the adjacent ends of the spring member joined as by welding.

Figure 6 illustrates a preferred use of the packing spring of the invention, namely, for sealing the reciprocating plunger of a power cylinder in combination with conventional packing material. The power cylinder indicated in its entirety by numeral 26 essentially consists of a front end member 28, a rear end member 30, a cylinder 32, a piston 34 and a piston rod or plunger 36. The plunger 36 extends through a central opening in the front end member 28, which end member is provided with a recess or cavity for receiving packing material 40. The rings of packing material have a chevron shape in section and it is customary to employ several of such rings in a manner as shown, wherein the rings encircle the plunger. The packing recess is closed by the cap 42 secured to end member 28 by securing screws 44 and pressure in an axial direction is applied to the packing material by the packing spring of the invention consisting of the coil spring 10 and retainer 12.

An important advantage of the present spring resides in the fact that the same applies a much greater pressure to the packing for its size than those heretofore employed. Also the present spring encircles the plunger 36 similar to the packing rings, and pressure is uniformly distributed over the entire area encompassed by the spring. It will be noted that the pressure is applied to the annular spring in a direction which is parallel to its axis; or, in other words, the compressive force is exerted in a direction perpendicular to the center line of the convolutions. Said spring has been designed to take advantage of the space limitations within the packing recess and a relatively heavy pressure is applied which is more than adequate to effectively seal rotating shafts, reciprocating plungers and similar apparatus of this nature.

As best illustrated in the graph of Figure 7 the present spring is characterized by a rate of deflection per unit of load which is uniform to about a fifty per cent load limit but which rate then increases beyond said limit. In other words, according to the graph wherein deflection in inches is plotted against load, the curve is substantially linear up to a fifty per cent load limit. Between this portion of the curve if the spring supports a load X with a deflection of Y, then if the load X is doubled the deflection is doubled. However, the present spring does not have this characteristic throughout its entire range. This is indicated by the flattening of the curve beyond the fifty per cent load limit which indicates an increase in the rate of deflection for the spring per unit of load.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a packing ring, a wire coil spring the ends of which have been joined to form a resilient member of annular shape, a retaining member of substantially annular shape having location within and extending through the convolutions of the coil spring substantially on the center line of the convolutions and on which the said coil spring is mounted, said retaining member having notches for receiving the wire element of certain convolutions respectively, to thereby hold the coil spring and the retaining member in assembled relation, and said convolutions being partially flattened so that they extend diagonally of the retaining member with adjacent convolutions being parallel, whereby the said resilient member will yieldingly oppose compressive forces in the direction of its axis.

2. In a packing spring, a wire coil spring the ends of which have been joined to form a resilient member of annular shape, a retaining member in the form of an open ring having location within and extending through the convolutions of the spring and on which the spring is mounted, said retaining member having spaced notches on both inside and outside edges for receiving the wire element of adjacent convolutions, respectively, to thereby hold the coil spring on the retaining member, and said convolutions being partially flattened so that they extend substantially parallel in a diagonal direction.

3. A packing ring as defined by claim 2 wherein the retaining member consists of a relatively strong metal member substantially flat throughout its extent, and wherein the notches are located diametrically opposite the opening in the retaining member.

4. An article of manufacture comprising, in combination, a wire coil spring the ends of which have been joined to form a resilient member of annular shape, a retaining member in the form of an open ring having location within and extending through the convolutions of the spring and on which the spring is mounted, said retaining member having spaced notches on both inside and outside edges for receiving the wire element of adjacent convolutions respectively, to thereby hold the coil spring on the retaining member, said convolutions being partially flattened so that they extend substantially parallel with each other but in a diagonal direction with respect to the retaining member, and whereby said resilient member of annular shape yieldingly supports a load in a direction parallel to its axis, and said resilient member being characterized by a rate of deflection which is approximately uniform up to about its fifty per cent load limit and which is non-uniform beyond said limit.

JOHN C. HANNA.

REFERENCES CITED

The following references are of record in the file of this patent:

UNITED STATES PATENTS

| Number | Name | Date |
| --- | --- | --- |
| 803,235 | Jordan | Oct. 31, 1905 |
| 1,683,697 | Rankin | Sept. 11, 1928 |
| 1,867,723 | Adams | July 19, 1932 |
| 2,154,275 | Linn | Apr. 11, 1939 |

FOREIGN PATENTS

| Number | Country | Date |
| --- | --- | --- |
| 136,041 | Austria | Dec. 27, 1933 |